Figure 1:
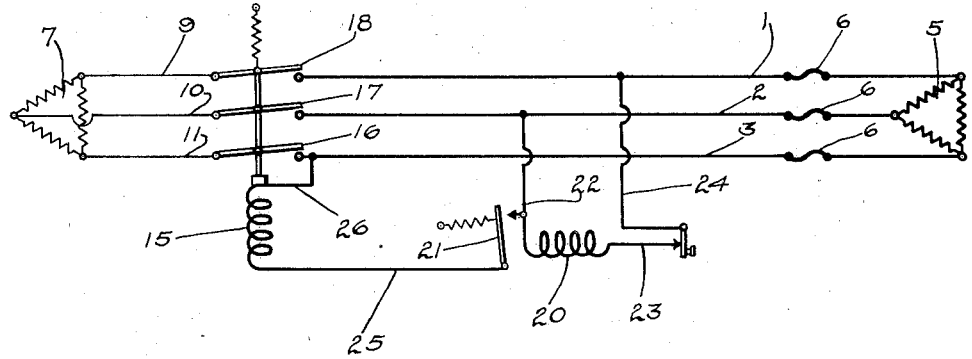

June 16, 1931.  G. D. BOWER  1,809,827

MOTOR PROTECTION DEVICE

Filed Oct. 15, 1927

*Inventor*
GEORGE D. BOWER
By Paul, Paul & Moore
*Attorneys*

Patented June 16, 1931

1,809,827

UNITED STATES PATENT OFFICE

GEORGE D. BOWER, OF COLUMBIA HEIGHTS, MINNESOTA, ASSIGNOR, BY MESNE ASSIGNMENTS, TO MINNEAPOLIS-HONEYWELL REGULATOR COMPANY, OF MINNEAPOLIS, MINNESOTA, A CORPORATION OF DELAWARE

MOTOR PROTECTION DEVICE

Application filed October 15, 1927. Serial No. 226,403.

This invention relates generally to the motor protection, an object of the invention being to provide means connected in the line of a three phase motor, so that in case of failure of any phase further operation of the motor will be prevented, thus avoiding overheating. Another object is to accomplish the control thermostatically. An important feature of the invention is the placing of two switches in, or across a motor line, in such manner that failure of any phase will open a main line switch.

Features of the invention include the broad idea of placing two switches in, or across, a motor so that failure of any phase will open a main switch, as well as the specific manner of making the connections, and the use of the specific elements shown.

Advantages will be set forth in the description of the drawings forming a part of this application, and said drawings being diagrammatic views, in which all circuit closing devices are shown in open position.

Figure 2:
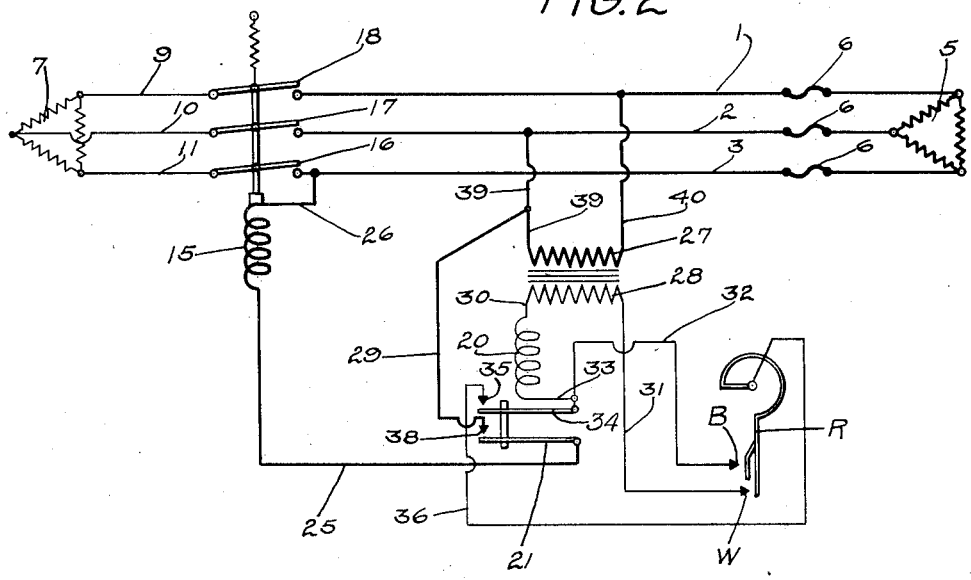

In the drawings forming a part of this application:

Figure 1 represents one application of the invention in which both switches are directly energized by the main line circuit, the device being shown in open position; and Figure 2 shows a form in which one of the switches is controlled through the secondary winding of the transformer whose primary winding is across two of the power lines, and in which this same switch is controlled thermostatically.

Referring first to Figure 1, the numerals 1, 2 and 3 respectively designate the lines from a three phase generator 5, each line being protected by a fuse 6. A three phase motor 7 has lines respectively indicated at 9, 10 and 11. The coil of a three phase main line magnetic switch is indicated at 15. Switch arms simultaneously operable by this coil are respectively indicated at 16, 17 and 18. The numeral 20 indicates the coil of a relay which controls switch arm 21. This coil is arranged so as to be operable upon energization of the main line and its circuit is arranged across lines 1 and 2. Conductor 22 connects one side of the coil 20 with line 2, and conductor 23 connects the opposite side of the coil 20 with one contact of any type switch (not shown), which may be a thermostatic element. The conductor 24 connects the other side of the switch or thermostatic element with line 1. Conductor 25 connects the armature of the relay 20 with one end of the coil 15, and conductor 26 connects the opposite end of the coil 15 with line 3. It will be thus seen that under normal conditions the closing of the circuit to coil 20 causes switch 21 to close. Both coils 15 and 20 are in series across lines 1 and 3; coil 20 is arranged across lines 1 and 2; coil 15 is across lines 2 and 3. This shows one application of the invention.

Operation

Referring to Figure 1, suppose the circuit across lines 23—24 to be closed. Coil 20 is energized and switches 21, 16, 17, 18 are closed. First suppose failure in line 1. From this failure, current through conductor 24 is interrupted, and coil 20 is directly de-energized causing armature 21 to open, resulting in de-energization of coil 15 and opening of switches 16, 17 and 18. The parts are now positioned as shown in Figure 1.

Let it be again supposed that all the switches are closed and that a failure in line 2 occurs. In this instance, again assume the circuit between 23 and 24 to be closed. Some current is now passing through both coils 20 and 15, (inasmuch as these coils are in series across lines 1 and 3) resulting in sufficient voltage drop to cause coil 15 to permit its switches to open.

Let it again be supposed that the switches are closed and that line 3 fails, in this instance the coil 15 is directly de-energized through lines 26—25, armature 21 and line 22, so that coil 15 is de-energized to open its switch. Therefore, the arrangement is such that either one or both coils are partially or totally de-energized on failure of any phase. In all instances, the opening of magnetic main switch is obtained to interrupt current to the motor. Note that this is accomplished by a pair of switches respectively arranged across different phases of a three phase line in such manner that if any phase fails, the switches will be either thrown in series across one of the remaining phases, or one of the other will be directly de-energized.

In the second form of the device shown in Figure 2, the pilot relay having the coil 20, is operated by means of the secondary of a transformer. The circuit to the coil 20 is also controlled by means of a double contact thermostatic element. In this instance, however, the coil 20 is connected on one side by conductor 30 to one side of the secondary of the transformer 28, and the other side of the transformer secondary is connected by conductor 31 with contact W of the thermostatic device. The coil 20 on the opposite side is connected by conductor 33 with the armature 34, controlled by the coil 20 and also by means of conductor 32, with contact B of the thermostatic device, thus connecting both coil 20 and armature 34 with contact B. The armature 34 is mechanically connected to the armature or switch arm 21, so that the two move in unison, in this instance in the same direction. The armature 34 is adapted to engage contact 35 which is connected by conductor 36 with the movable arm or thermostatic element R. Armature 21 engages with contact 38 which is connected by conductor 29 with line 2, and with one side of the primary 27 of the transformer by means of conductor 39. The other side of the primary 27 of the transformer is connected by conductor 40 with line 1. The low voltage relay having the coil 20 is directly controlled by the thermostat so that only when element R contacts both elements W and B, can the coil 20 be energized to close switches 21 and 34.

In the form shown in Figure 2, the primary of the transformer is connected across lines 1 and 2 instead of the coil 20, as in the form shown in Figure 1. In respect to the relation of the two coils, however, this arrangement is, in one sense, at least substantially the same as that first described, in that the coil 27 is in series with the coil 15 across lines 1 and 3, so that current travels through the transformer coil as well as the three phase magnetic switch coil. Further there is an analogy in that the impedance of the coil 27 is so high that practically all the voltage drop occurs across this coil. It will be seen that if line 2 fails, we get some power to both coils. If line 1 fails, the transformer is directly de-energized and if line 3 fails, the coil 15 is directly de-energized.

Operation of device of Figure 2

Suppose a temperature to be proper to cause element R to first engage contact W and then contact B so that both contacts are closed. This will cause energization of the coil 20 resulting in closing of the switches 21—34, respectively controlling the holding circuit through line 36 to the thermostatic device, and the current between the elements 27 and 15. Whenever the device is in this closed position and upon failure in any phase, the current from one line in coil 15 in the main switch to the other two lines or vice versa is controlled through the pilot switch 21. Upon break of any line, the three phase magnetic switch will be affected, whenever each of the two of the lines fail, while only the primary coil of the transformer will be affected when the third line fails. Therefore, in the first instance, the relay coil is directly de-energized as the result of de-energization of the primary of the transformer and in the second instance the three phase magnetic switch coil 15 is de-energized when the failure is such as to throw it in series with the primary of the transformer, and in the third instance the three phase magnetic switch will be directly de-energized and in this latter instance relay coil will remain energized because sufficient current traverses the primary to supply sufficient current in the secondary to hold the pilot relay closed.

Therefore, no matter which phase of the motor fails, power to the motor is interrupted. Because it has been seen that on failure of one the transformer is de-energized and, therefore, the pilot switch is opened. On failure of line 3 the three phase magnetic switch is directly de-energized, due to the series relation of the coils 15 and 27, causing voltage drop sufficient to de-energize the coil 15. It will be noted that in this instance the pilot switch remains closed, because sufficient current is delivered by the transformer to the coil 20. In case of failure in line 2, the primary of the transformer is de-energized and the pilot switch 22 opens resulting in opening of the three phase magnetic switch.

It will also be noticed that the primary of the transformer is across lines 1 and 2, that the coil of the three phase magnetic switch and the primary of the transformer are in series across lines 1 and 3 and also that the coil of the three phase magnetic switch is in circuit across lines 2 and 3.

When the element R makes or engages both contacts W and B the pilot relay simultaneously closes switches 21—34, and the closing of switch 21 closes the circuit through coil 15.

In one form of the invention, as completed, the impedance of the coil 15, when the relay armature is closed, is approximately 167 ohms. The current required to hold the relay closed is 0.22 amperes. This amount of current is drawn when the voltage across the terminals of the coil is 45 volts. The characteristics of the transformer, when the secondary is loaded with the coil 20, are as follows: Impedance approximately 1700 ohms, the current drawn with 110 volts across the primary is .06 ampere. When the transformer and coil 15 are thrown across the 110 volt line in series, the voltage divides across the two approximately in proportion to their impedances, since the power factors of the two loads are approximately the same. Therefore, with the coils in series, there will be a voltage drop across the transformer primary of from 95 to 105 volts. At 110 volts, the current drawn by the transformer primary, is slightly less than .06 ampere. This current passes through both coils 15, and the primary of the transformer, since they are in series. Therefore when the large relay, which requires 0.22 amperes, to hold it closed, is thrown across the 110 volt line in series with a coil which limits the current to .06, or less, the large relay will open, since it is receiving only approximately 27% of the current required to hold it closed.

I claim as my invention:

1. A three phase line, including a main switch, said switch including a coil which operates it, a second coil connected across one phase of the line, and a second switch connected in a manner to control current through both coils, and also through the main switch coil to another phase.

2. A three phase line including a main switch, said switch including a coil which operates it, a second coil connected across one phase of the line, a second switch connected in a manner to control current through both coils, and also through the main switch coil to another phase, and thermally operable means including connections for controlling the second switch.

3. A three phase line, a main switch including an operating coil, a second coil connected across two of the phases, a second switch connecting the coil of the main line switch across the third phase, said second coil when energized controlling the second switch to connect the two coils in series with the remaining phase.

4. A three phase motor line, a three phase magnetic switch controlling the line including an operating coil, a second coil connected across two of the phases, and a switch for connecting this coil in series with the coil of the magnetic switch across the third phase.

5. A three phase line including a main switch, said switch including a coil for operating it, a second coil connected across one phase, a second switch connected in a manner to control current through both coils, and also through the main switch coil to another phase.

6. A three phase line including a main switch, electrically operable means for controlling said switch including a circuit connected across one phase and a switch for controlling the circuit, and electrically operable means for controlling said last mentioned switch including a circuit connected and adapted to be closed across another phase, the last mentioned switch being so arranged that when closed it connects the circuits of said electrically operable means across the remaining phase.

In witness whereof, I have hereunto set my hand this 8th day of October 1927.

GEORGE D. BOWER.